US 12,254,156 B2

United States Patent
Fan et al.

(10) Patent No.: US 12,254,156 B2
(45) Date of Patent: Mar. 18, 2025

(54) PALM REJECTION METHOD FOR ACTIVE PENS AND TOUCH SCREEN DEVICES

(71) Applicant: STMicroelectronics International N.V., Geneva (CH)

(72) Inventors: Bin Fan, Baishan Town (CN); Pengcheng Wen, Beijing (CN)

(73) Assignee: STMicroelectronics International N.V., Geneva (CH)

( * ) Notice: Subject to any disclaimer, the term of this patent is extended or adjusted under 35 U.S.C. 154(b) by 0 days.

(21) Appl. No.: 18/365,789

(22) Filed: Aug. 4, 2023

(65) Prior Publication Data

US 2025/0044898 A1 Feb. 6, 2025

(51) Int. Cl.
*G06F 3/041* (2006.01)
*G06F 3/044* (2006.01)

(52) U.S. Cl.
CPC ...... *G06F 3/04186* (2019.05); *G06F 3/04166* (2019.05); *G06F 3/0441* (2019.05); *G06F 3/0442* (2019.05); *G06F 3/0446* (2019.05)

(58) Field of Classification Search
CPC ................................................. G06F 3/04186
USPC ....................................................... 345/174
See application file for complete search history.

(56) References Cited

U.S. PATENT DOCUMENTS

| | | | |
|---|---|---|---|
| 2011/0012855 | A1 | 1/2011 | Yeh et al. |
| 2012/0262407 | A1 | 10/2012 | Hinckley et al. |
| 2013/0300672 | A1* | 11/2013 | Griffin ............... G06F 3/04883 345/173 |
| 2014/0092024 | A1 | 4/2014 | Ananthapadmanabh et al. |
| 2014/0104191 | A1* | 4/2014 | Davidson ............ G06F 3/04162 345/173 |
| 2015/0205426 | A1 | 7/2015 | Conzola et al. |
| 2017/0003814 | A1 | 1/2017 | Park |
| 2018/0348956 | A1 | 12/2018 | Schwarz et al. |
| 2021/0034181 | A1 | 2/2021 | Park et al. |

* cited by examiner

*Primary Examiner* — Long D Pham
(74) *Attorney, Agent, or Firm* — Slater Matsil, LLP

(57) ABSTRACT

A method of operating a touch screen panel includes initiating a communication between the panel and an active pen and determining a touch zone of the panel. The touch zone includes communication channels that are operating by touch while bi-directional communication is occurring between the panel and active pen. Communications channels within the touch zone are disabled and communication between the panel and the active pen can occur while the communications channels within the touch zone are disabled. When it is determined that the communication between the panel and the active pen has stopped, communications channels continue to be disabled within the touch zone for a set time delay while no communication occurs between the panel and the active pen. After the set delay time, the communication channels within the touch zone are enabled.

20 Claims, 11 Drawing Sheets

PALM REJECTION METHOD FOR ACTIVE PENS AND TOUCH SCREEN DEVICES

TECHNICAL FIELD

The present invention relates generally to a touch screen devices and, in particular embodiments, to a method for palm rejection for active pens and touch screen panels.

BACKGROUND

Electronic devices that are designed for user interaction have historically utilized external input devices such as keyboards, key pads, and/or mice to capture user input. In recent years, there has been a push away from the more traditional methods, as consumers prefer the convenience of portable devices that can support a more flexible lifestyle. To this end, there has been a rise in smaller, portable, hand-held electronic devices, such as mobile phones, tablets, gaming systems, etc. This has given rise to the popularity of touch screens and touch panel displays as systems for capturing user input. Not only do they provide the functionality of the traditional electronic devices, but touchscreens provide additional features.

With the growth of smart phones and tablets, application software, such as painting software, requires higher precision touch. Applications like this have led to the use of the pen (stylus) to be more common and higher performance of the pen is needed.

The pens can be divided into active pens and passive capacitive pens. Passive capacitive pens function similar to a finger touching a touchscreen device. Coordinates of the pen are determined based on changes in capacitance at the point of touch. In an active pen, a touch IC sends an uplink signal to a pen for pairing. The pen sends a downlink signal when paired. The touch IC of the touchscreen receives the downlink signal and calculates the coordinates of the pen.

Active pens allow the user touch the touchscreen with improved precision. For example, given the appropriate software, users are able to utilize active pen for precise sketching, drawing, and hand writing. The performance of an active pen depends on the quality of signal between the active pen and a touchscreen, and interference with the quality of the signal may affect the pen's performance.

SUMMARY

Embodiments of the invention provide a new palm rejection method to improve the active pen performance. As discussed below, embodiments relate to touch screen devices as well as active pens in combination with touch screen devices.

One general aspect includes a method of operating a touch screen panel with an active pen. The method comprises initiating a communication between the panel and an active pen and determining a touch zone of the panel. The touch zone includes communication channels that are operating by touch while bi-directional communication is occurring between the panel and active pen. The method also includes disabling communications channels within the touch zone, performing communication between the panel and the active pen while the communications channels within the touch zone are disabled, determining that the communication between the panel and the active pen has stopped, continuing to disable the communications channels within the touch zone for a set time delay while no communication occurs between the panel and the active pen, and enabling the communication channels within the touch zone after the set time delay.

Another general aspect includes a matrix panel that includes a plurality of touch sensors arranged in columns and rows. The touch screen device also includes a controller configured to detect an active pen, transmit a signal to the active pen, receive a signal generated by the active pen, determine a user's touch coordinates on the matrix panel, disable touch sensors associated with the user's touch coordinates, determine whether coordinates of the active pen on the matrix panel while the touch sensors associated with the user's touch coordinates are enabled or disabled, determine that the active pen is no longer detected when the coordinates are disabled, set a timer to run for a set delay time, again determine coordinates of the active pen on the matrix panel while the touch sensors associated with the user's touch coordinates remain disabled in response to detection of the active pen before the set delay time, and enable the touch sensors associated with the user's touch coordinates in response to the set delay time expiring without detection of the active pen.

Another general aspect provides a method of operating a touch screen panel with an active pen. The method comprises pairing the active pen and the touch screen panel, enabling all channels of the touch screen panel, detecting a touch while the active pen and the touch screen panel are paired, determining a touch zone in response to determining the touch, disabling the channels in the touch zone, determining active pen locations based on communication between the active pen and the touch screen panel, determining that active pen is no longer communicating with the touch screen panel, setting a timer in response to determining that active pen is no longer communicating with the touch screen panel, attempting to detect the pen for at least a set delay time after setting the timer, determining active pen locations based on communication between the active pen and the touch screen panel while the channels in the touch zone remain disabled in response to the active pen being detected before expiration of the set delay time, and enabling the channels in the touch zone in response to expiration of the set delay time without detection of the active pen.

Other embodiments and variations are described herein.

BRIEF DESCRIPTION OF THE DRAWINGS

For a more complete understanding of the present invention, and the advantages thereof, reference is now made to the following descriptions taken in conjunction with the accompanying drawings, in which:

FIGS. 6A and 6B show raw data of the downlink signal from an active pen;

DETAILED DESCRIPTION OF ILLUSTRATIVE EMBODIMENTS

Embodiments of the present invention relate to a touch screen panel that can send a detectable uplink signal to an active pen by eliminating the grounding condition created by a user's palm or finger on the touch screen panel. Various embodiments of the present application disclose a device and a method to strengthen the uplink signal to an active pen.

To improve the user experience of a touchscreen with an active pen, a touchscreen and an active pen may communicate bi-directionally. In other words, the active pen may be configured to send downlink signals to the touchscreen and receive uplink signals from the touchscreen. The active pen may receive the uplink signal from the touchscreen via a capacitive coupling between the active tip of the active pen and the touchscreen. The active pen analyzes the uplink signal by measuring the change in potential between the active pen tip and a ground potential.

A problem can arise when the user's hand, e.g., the palm, contacts the touchscreen while the active pen is in operation. Since the user is holding the active pen, the active pen is grounded via the user's body. In other words, the active pen and the user share a common ground. When the user is holding the touchscreen chassis, then the active pen, the touchscreen and the user share a common ground. However, because the touchscreen ground is not designed to be the same as the user ground, the active pen may analyze the uplink signal incorrectly.

Embodiments of the invention can address issues that arise when touchscreens are not able to send detectable uplink signals to active pens when the user is contacting the touchscreen (e.g., the pen is poorly grounded). These solutions are superior to the current technique of incorporating stronger uplink signals, which may cause OLED screen displays to become unstable and flicker.

Figure 1:
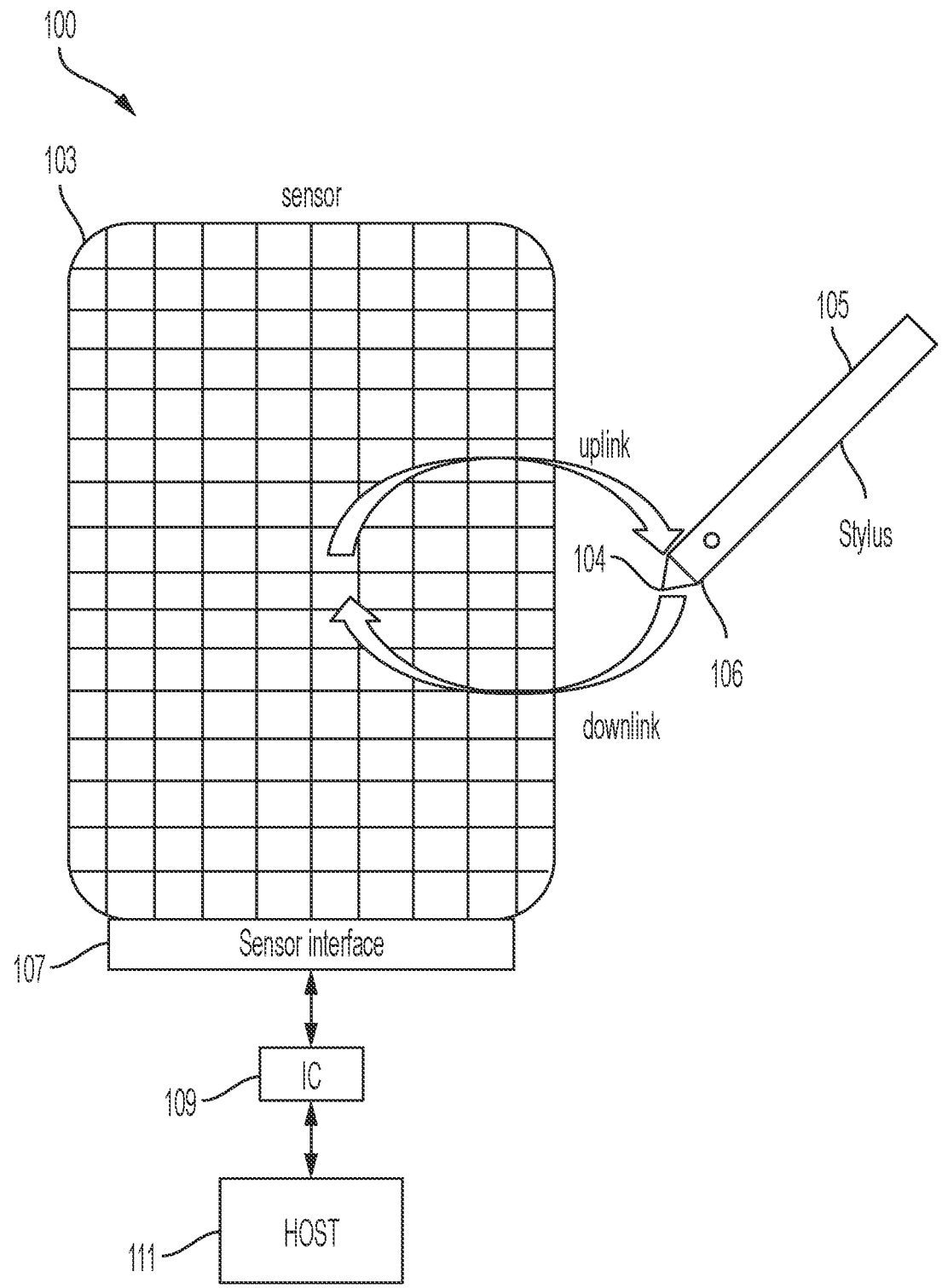
FIGS. 1 and 2 shows a schematic representation of a touch screen panel according to embodiments of the present application.

FIG. 1 shows a schematic representation of a touch screen panel according to an embodiment of the present application.

The touch screen panel 100 may include a sensor 103, a sensor interface 107, a touch controller or touch IC 109, and a host 111. The touch screen panel 100 is compatible with an active pen 105. In various embodiments, the touch screen panel 100 may be incorporated in a tablet, computer, smart phone, handheld gaming unit, or similar electronic devices.

The sensor 103 may include a plurality of touch sensors arranged in rows and columns across a touch screen panel 100. The touch sensors may be formed by electrically coupling the touchscreen to rows of capacitive electrodes and columns of capacitive electrodes that span the entirety of the touchscreen. The rows of capacitive electrodes may span the touchscreen in the x-direction. The columns of capacitive electrodes may span the touchscreen in the y-direction. The rows of capacitive electrodes and the columns of capacitive electrodes have a measurable mutual capacitance at their intersections. In addition, each of the rows of capacitive electrodes and each of the columns of capacitive electrodes may have a self-capacitance that may be measured with respect to ground.

In one or more embodiments, the active pen 105 and the touch controller 109 may establish communication through a sensor array 103 and a sensor interface 107. The touch controller 109 and the active pen 105 may communicate bi-directionally. The sensor 103 may be configured to receive a signal generated from the active pen 105 and transmit a signal generated from the touch controller 109. The sensor interface 107 may be configured to transmit the signal received by the sensor 103 to the touch controller 109 and transmit the signal generated by the touch controller 109 to the sensor 103. The signal transmitted from the touch controller 109 through the sensor interface 107 and sensor 103 to the active pen 105 may be defined as an uplink signal, and the signal transmitted by active pen 105 to the sensor 103 through the sensor interface 107 to the touch controller 109 may be defined as a downlink signal.

In one or more embodiments, the touch controller 109 may send the uplink signal to the active pen 105 for pairing. The uplink signal may be transmitted from the touch controller 109 through the sensor interface 107 and the sensor 103 to the active pen 105. When pairing is successful, the active pen 105 sends a downlink signal to the touch controller 109. The downlink signal may be transmitted from the active pen 105 through the sensor 103 and the sensor interface 107 to the touch controller 109. When the touch controller 109 does not receive a valid downlink signal, the touch controller 109 may timeout and send an unpair command to the pen via an uplink signal. In general, active pens are more sensitive to uplink signals than a touch controller is to downlink signals due to signal strength.

In one or more embodiments, the touch controller 109 may report the pen coordinates to a host 111. The host 111 may receive a user's touch coordinates in addition to the pen coordinates. The host 111 can include any processing hardware that executes software that utilizes the user input obtained from the touchscreen. In embodiments discussed herein, this user input can be either passive (e.g., by touch with a finger or non-active pen or stylus) or active (e.g., with an active pen).

In one or more embodiments, the active pen 105 may be held in a hand of the user and used to input more precise handwriting, drawings, sketches, and other inputs into the touch screen panel 100 while touching the active tip 104 of the active pen 105 to the sensor 103. The active pen 105 may be a USI-compatible pen.

In various embodiments, the active pen 105 may comprise an active tip 104 comprising an active electrode made out of a conductive material such as metal, conductive paint, conductive ink, or any other suitable conductive material. The active tip 104 may be configured to function as an antenna configured to receive an uplink signal from the sensor 103 and transmit a downlink signal back to the sensor 103. After the sensor 103 detects the active tip 104 via the downlink signal, the sensor 103 may be configured to transmit an uplink signal to the active tip 104.

Figure 2:
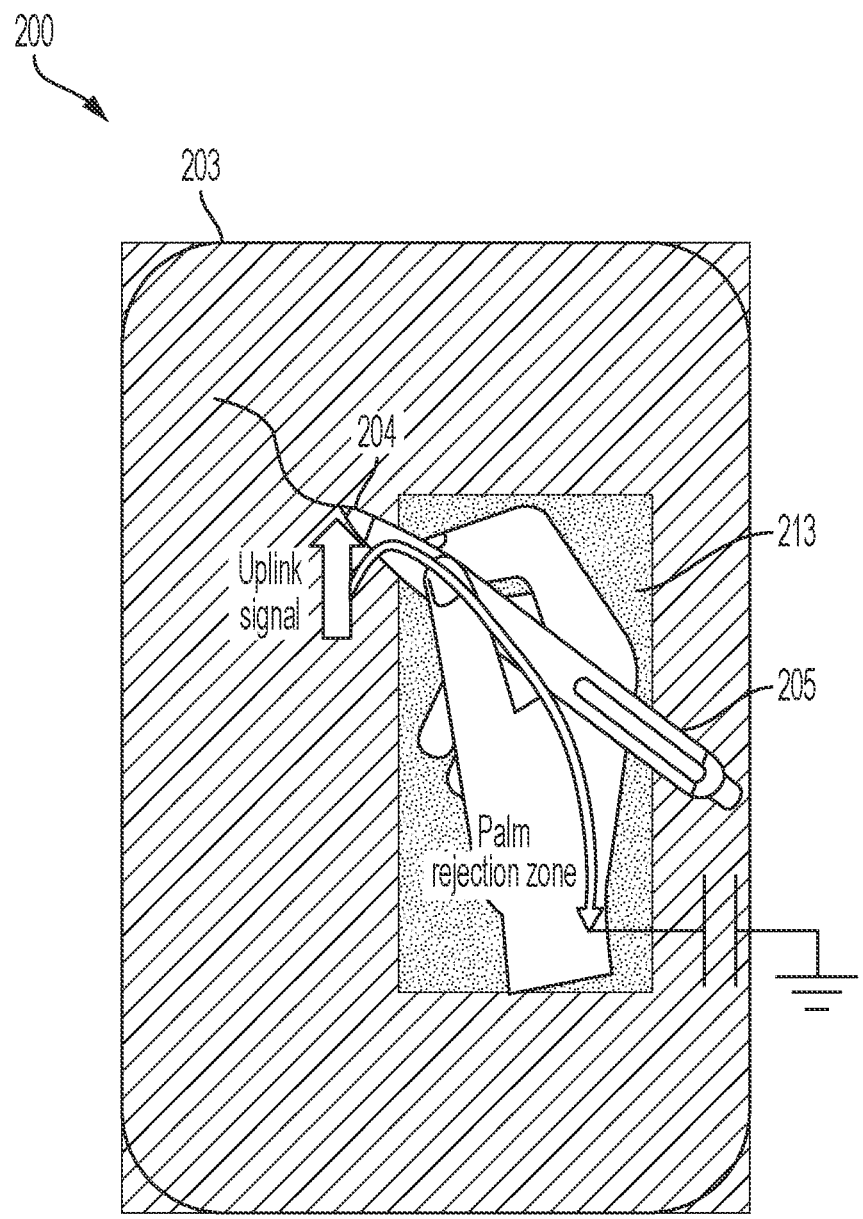

FIG. 2 shows a schematic representation of a touch screen panel according to an embodiment of the present application and is used to describe an issue that can arise when the user's palm contacts the panel.

The touch screen panel 200 may include a touchscreen 203 that is designed to operate with an active pen 205. The touchscreen 203 may be sensitive to grounding potential of a user's body while transmitting the uplink signal from the device to the active pen. Under floating conditions, when the active pen 205 is hovering over the touchscreen 203 and the palm is resting on the touchscreen, the uplink signal may couple with the user's body to ground. The user's body coupled to ground typically yields low quality uplink signal and blocks the communication between the active pen 205 and the touch controller. An unstable uplink signal received by the active pen 205 can result in a decode error. In addition, the active pen 205 may become stuck in discovery mode and may not send a downlink signal to the touch controller. When this happens, the touch controller will fail to detect the active pen. In one or more embodiments, the palm rejection zone 213 of the touchscreen 203 may be deactivated to prevent the user's palm from coupling to ground.

In an ideal working condition, the user contacts the touchscreen 203 using only the active pen 205. Thus, potential change sensed at the active tip 204 can be compared with a reference potential, i.e., ground, and converted through the front-end analog circuitry to detect the uplink signal correctly, e.g., through a charge to voltage conversion circuit. The ground for this conversion circuit is provided by the user holding the active pen 205.

However, in reality, the user likely contacts the touchscreen at multiple regions on the touchscreen 203. The user may hold the active pen 205 with one hand (e.g., the right hand in the figure) with the right palm touching the touchscreen 203. When capacitive objects such as the user's body or active objects, such as an active pen 205, are brought proximate to the touchscreen 203, they may be electrically coupled to it. Therefore, the user's right palm may be coupled to the touchscreen 203.

As explained above, the active pen 205 may be grounded via a user capacitance to the user holding the active pen 205. In other words, the active pen 205 and the user's body share a common ground. In one or more embodiments, when the active tip 204 receives an uplink signal, the active pen 205 may detect the uplink signal by comparing the potential at the active tip 204 and the potential of the user's body. However, when the user is touching the touchscreen 203, the same uplink signal is also transmitting into the user, and this signal may cause the circuit ground to follow the same pulsing of the uplink signal, which will offset the signal being measured through the front-end circuitry of the active pen 205.

As further described below, various embodiments avoid or cancel the effects of parasitic coupling introduced by the user while using the active pen.

Figure 3A:
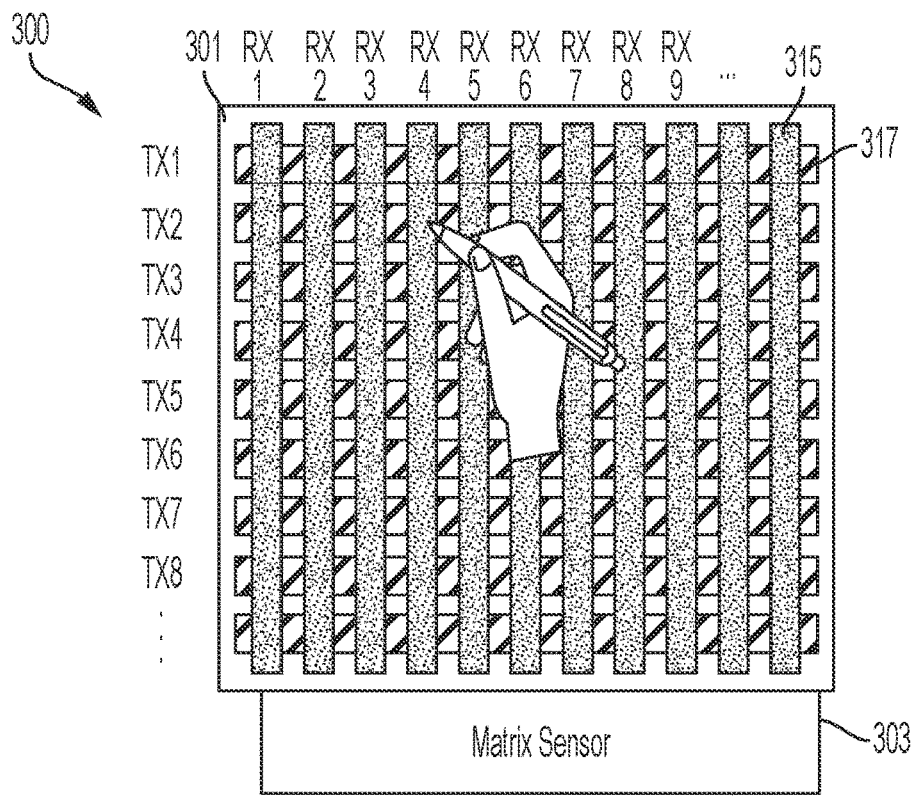
FIGS. 3A and 3B show diagrams of communication channels on a touch screen according to an embodiment of the present application.
Figure 3B:
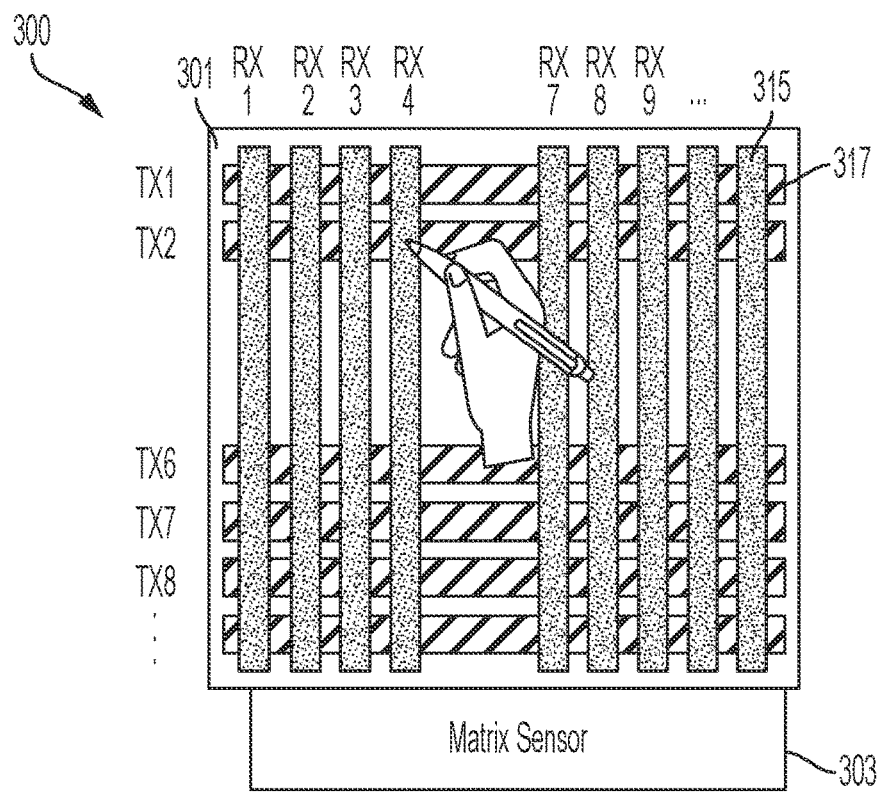

FIGS. 3A and 3B show a diagram of communication channels on a touch screen panel 300 according to an embodiment of the present application.

The touch screen panel 300 is configured to detect touches made on the touch screen panel 300. The touch screen panel 300 may include a display layer 301, a matrix sensor 303, and a plurality of communication channels arranged in rows and columns across the touch screen panel 300. The plurality of communication channels may include transmitting (TX) touch sensors 317 and receiving (RX) touch sensors 315. The TX touch sensors may also be referred to as TX electrodes or TX channels. The RX touch sensors may also be referred to as RX electrodes or RX channels. The TX touch sensors 317 and RX touch sensors 315 may span the entirety of the touch screen panel 300 in a grid-like fashion that are operable by a touchscreen controller. In various embodiments, the TX touch sensors 317 may be formed in rows across the touch screen panel 300 and the RX touch sensors 315 may be formed in columns across the touch screen panel 300. In other embodiments, the RX touch sensors 315 may be formed in rows across the touch screen panel 300 and the TX touch sensors 317 may be formed in columns across the touch screen panel 300. The TX touch sensors 317 and the RX touch sensors 315 may overlap in certain embodiments.

The RX touch channels 315 and TX touch channels 317 may be enabled or disabled when a user's touch is detected by the matrix sensor 303. In one or more embodiments, the matrix sensor may transmit data, e.g., an uplink signal, from the plurality of communication channels to a touch controller. The data from the communication channels may be transmitted from the touch controller to an active pen. In various embodiments, the data from the communication channels may be received by the touch controller from an active pen.

The touch controller may be coupled to the TX touch sensors 317 and the RX touch sensors 315. During a touch sensing operation or a touch scan operation, the touch controller may transmit touch driving signals to the TX touch sensors 317 and receive touch sensing signal from the RX touch sensors 315. When a finger presses on an intersection of one TX touch sensor 317 and one RX touch sensor 315, the mutual capacitance or self-capacitance of these sensors will be changed. Thus, the finger touch will be detected and the touch sensing signals will be changed. The touch controller may measure and analyze the touch sensing signals, and report touch coordinates to the host.

When an active pen is in close proximity to the touch screen panel 300, the TX touch sensors 317 and the RX touch sensors 315 may sense active signals transmitted from the active pen to detect it and measure its coordinates. The signal from the active pen to the touch screen can be referred to as the downlink signal. The uplink signal from the touch screen to the active pen may also be referred to as a beacon.

The touch controller may trigger the touch screen panel 300 to transmit an uplink signal to the active pen and receive a downlink signal from the active pen. The uplink signal may be transmitted by the TX touch sensors 317, or the RX touch sensors 315, or both the TX touch sensors 317 and the RX touch sensors 315. Flicker may be induced on the display layer 301 by the uplink signal triggered by the touch controller to communicate with the active pen. Specifically, when the uplink signal is transmitted during the display updating, interference to the display layer 301 may occur. This may lead to a reduced brightness of the display, resulting in noticeable flicker on the display layer 301 by a user.

FIG. 3A illustrates a default setting of the communication channels on a touch screen panel 300 in accordance with an embodiment of the present application. In the default setting, when the user's touch is not in contact with the touch screen panel 300, the RX touch channels 315 and TX touch channels 317 are all enabled to send an uplink signal to an active pen. In this context, "all channels" refers to all channels being used in the specific application being implemented at that time.

FIG. 3B illustrates a palm rejection setting of the communication channels on a touch screen panel 300 in accordance with an embodiment of the present application. In the palm rejection setting, the RX touch channels 315 and the TX touch channels 317 are disabled where a user's palm may be resting on the touch screen panel 300. For example, in one embodiment, the user's palm may be in contact with the touch screen panel 300 in the intersection of the RX touch channels, RX5 and RX6, and TX touch channels, TX3, TX4, and TX5. In this example, the channels TX3, TX4, TX5, RX5, and RX6 may be disabled from sending an uplink signal and the uplink signal are sent from the enabled channels to the active pen.

Figure 4:
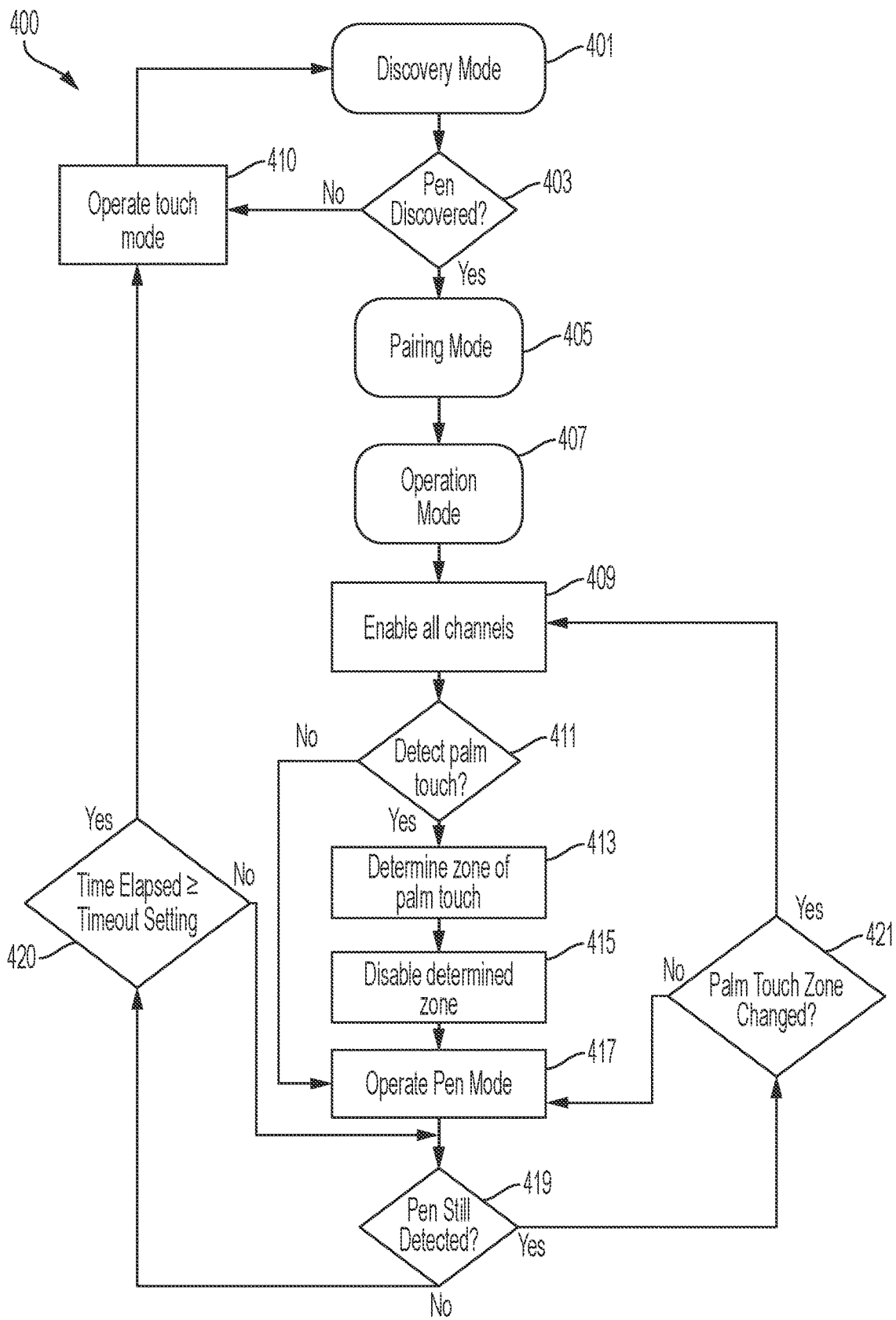
FIG. 4 shows a flowchart of a method of operating an active pen with a touch screen panel according to an embodiment of the present application.

FIG. 4 shows a flowchart of a method of operating an active pen with a touch screen panel according to an embodiment of the present application.

The method 400 of operating an active pen with a touch screen panel includes a discovery mode 401, pairing mode 405, and operation mode 407. In discovery mode 401, the touch screen panel and active pen may initiate communication. The active pen searches for periodic beacons from the touch screen panel and acknowledges when a beacon is detected. When the beacon is detected, the active pen may be discovered (step 403) and switch to pairing mode 405. When the active pen is not discovered, the touch panel may operate in touch mode 410. Touch mode 410 may include touch from a user's finger or a passive pen. In one or more embodiments, all TX and RX channels on the touch screen panel may be enabled in touch mode.

In pairing mode 405, the active pen may transmit downlink configuration data and active pen capabilities to the touch screen panel. The active pen will receive uplink signal from screen and then decode the signal to determine whether there is success or an error. When pairing is successful, communication is established and then pen will send downlink signal to screen. At this point, the active pen may switch to operation mode 407. Further description of an embodiment of pairing is provided with respect to FIG. 5.

In operation mode 407, the active pen transmits the active pen data and optional position packets to the touch screen panel. The active pen may then receive and process beacons for commands.

In one or more embodiments, in operation mode 407, all TX and RX channels are enabled (step 409) on the touch screen panel to allow communication with the active pen or a user's touch. This stage is illustrated in FIG. 3A, for example. When the TX and RX channels are enabled, the touch screen panel may detect the user's palm (or other body part) touch (step 411). If no touch is detected, the pen will operate in the pen mode as shown in step 417.

When the user's palm touch is detected in step 411, the touch screen panel may determine a zone (step 413) by locating the position of the user's palm or finger touch. The palm touch zone corresponds to the TX and RX communication channels of the panel that receives finger activation touch as shown in FIG. 3B. When determined zone has been identified, the corresponding TX and RX communication channels may be disabled within the determined zone in step 415. The disabled communication channels of the determined zone can prevent incidental contact from the user's palm or fingers. When the determined zone is disabled, the active pen may operate (step 417) in the enabled TX and RX communication channels of the touch screen panel.

During pen operation mode (step 417), the touch panel detects whether the active pen is still detected (step 419). When the active pen is detected, the touch panel determines whether the palm touch zone has changed in step 421. When the palm touch zone changes (step 421), the touch screen panel returns to step 409 to determine the current zone of palm touch. When the palm touch zone remains the same, the touch screen panel may continue to operate in pen mode.

In one embodiment, when the algorithm returns to step 409 from step 421, not all of the channels need be enabled. In some cases, a subset of channels can be enabled using inferred information on the palm location. In another embodiment, the palm zone can be updated by assuming the zone size stays constant and moving the zone as the active pen approaches the palm touch zone. For example, if the active pen is moving along the panel toward the palm touch zone, an assumption can be made that the user's hand is moving in a similar direction and the touch zone can be updated accordingly.

When the active pen is no longer detected (step 419), the user might be just pausing the interaction or might be discontinuing the use of the active pen. To determine which, the touch screen panel can calculate a length of time elapsed since the active pen was last detected. When the time elapsed exceeds a predetermined timeout setting (step 420), the touch screen panel switches to operate in touch mode 410. When the time elapsed does not exceed the predetermined timeout setting, the touch panel continues to operate in pen mode (step 417).

In one or more embodiments, when the active pen does not pair with the touch screen panel (step 403) or is not detected after a predetermined timeout setting (step 420), the active pen may return to discovery mode 401.

Figure 5:
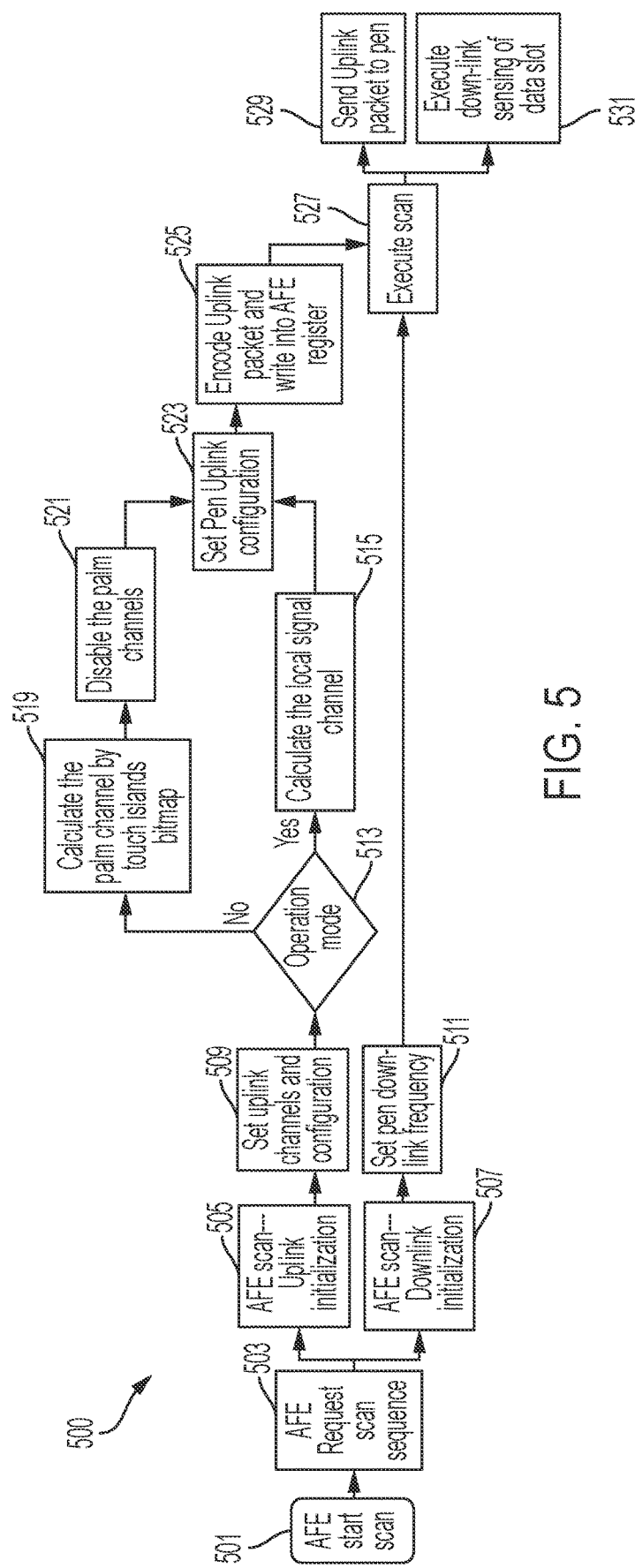
FIG. 5 shows a flowchart of a method of connecting a touch screen panel to an active pen according to an embodiment of the present application.

FIG. 5 shows a flowchart of a method of connecting a touch screen panel to an active pen according to an embodiment of the present application. This flowchart illustrates a more detailed embodiment, which is provided only by way of example.

Referring to FIG. 5, the process 500 of connecting a touch screen panel to an active pen. In one or more embodiments, the touch screen panel may begin with an analog-front-end (AFE) frame scan 501 and request the scan sequence 503 to set the AFE hardware registers which includes uplink initialization 505 and downlink initialization 507. The uplink initialization 505 may include setting the uplink channels and configuration 508 according to the mode of the active pen. Corresponding to FIG. 3A, in pairing mode, all columns of channels and rows of channels may be enabled by default.

However, in various embodiments of the present application, when a user's palm is in contact with the touch screen panel in pairing mode, the palm channels may be calculated using a touch island bitmap 519 and the calculated communication channels may be disabled 521, corresponding to FIG. 3B. The AFE pen uplink configuration may then be set 523, and the pen uplink data may be encoded and written into the AFE hardware register. The downlink initialization 507 may include setting the active pen downlink frequency 511.

When the AFE hardware registers is complete, the AFE scan may be executed 527. For the uplink signal, the AFE scan may trigger one scan of the AFE pen uplink and send an uplink packet signal 529 from all enabled TX and RX channels to the active pen for pairing using a self-capacitance method. For the downlink signal, the AFE scan may receive the downlink signal data 531 from the active pen.

In one or more embodiments, the touch island bitmap may be calculated for palm detection by analyzing multiple islands of mutual strength. Upon palm touch, mutual islands may accumulate along an X-direction and Y-direction resulting in elongated touch areas. When the strength of the area of palm touch exceeds a given limit (area of palm touch>fgr_max_area), palm detection may be confirmed. The area fgr_max_area is and used to detect whether a palm is being detected. The touch nodes exceeding a given threshold, e.g., a threshold of 100, may be marked on a TX and RX channels bitmap. When the mutual touch nodes form islands accumulated along an X and Y-axis, the overlapping island on the bounds form elongated touch areas for the resulting touch island bitmap. Since different panels have different features, it is recognized that this detection method is but one possible example.

Figure 6A:
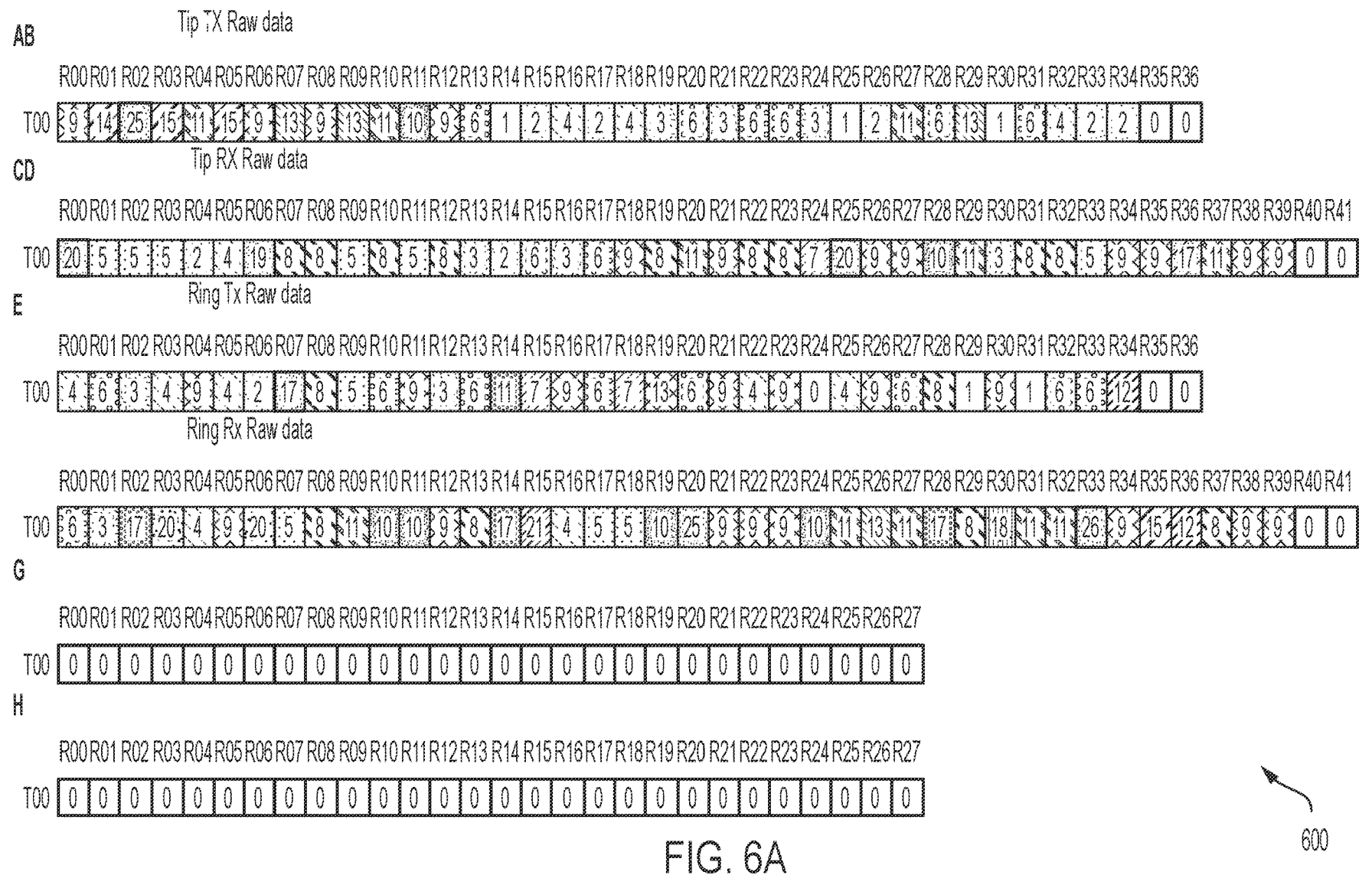
Figure 6B:
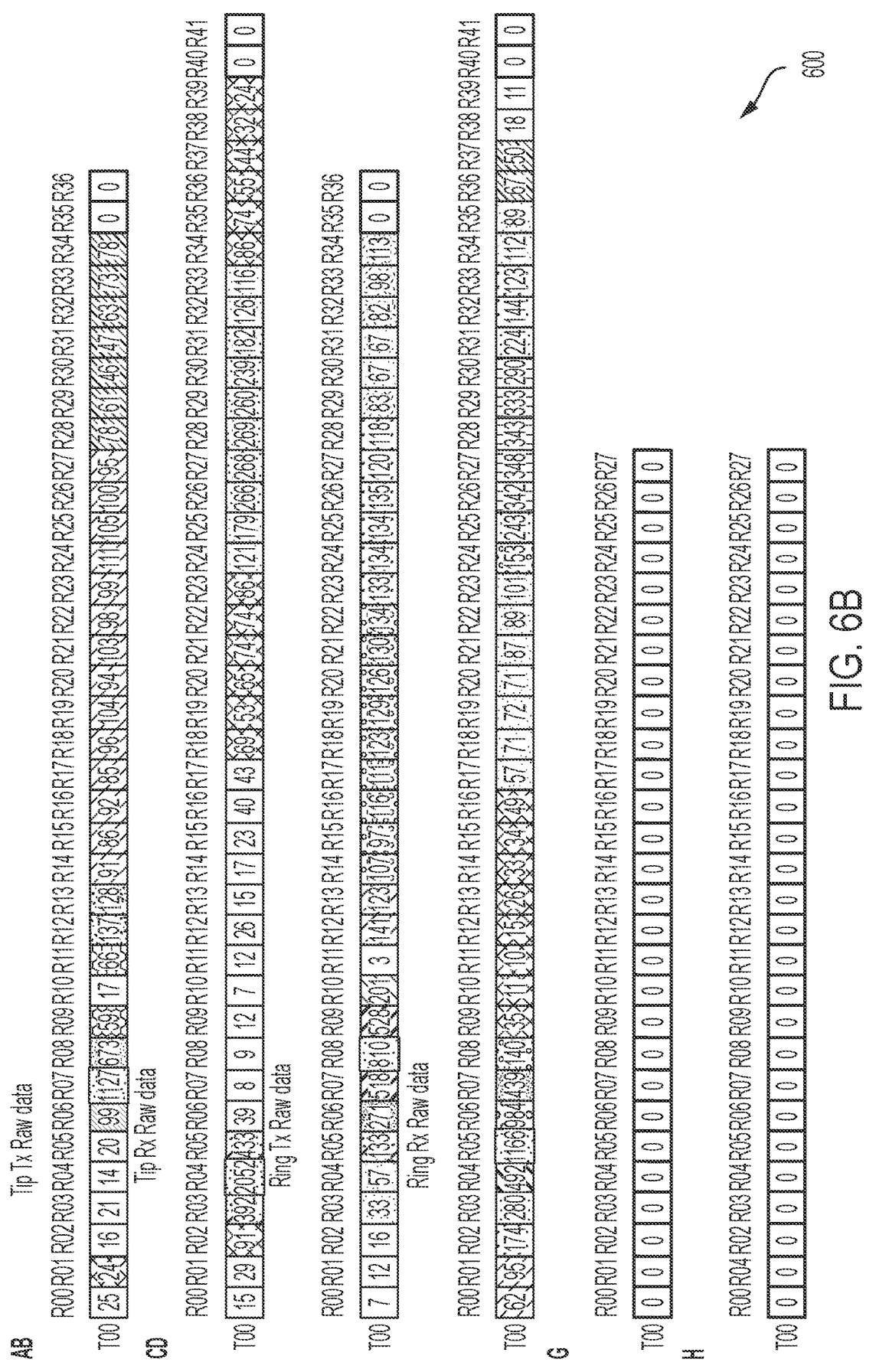

FIGS. 6A and 6B show raw data of the downlink signal from an active pen according to an embodiment of the present application. These charts show the difference before the palm touch zone is disabled (FIG. 6A) and after the palm touch zone is disabled (FIG. 6B).

In one or more embodiments, the touch controller receives a downlink signal from an active pen and decodes the signal to form the raw data. The active pen may unpair with the touch controller when a user's palm is in contact with the touchscreen. As shown in FIG. 6A, the raw data is chaotic as the active pen is unpaired with the touch controller when a user's palm is in contact with the touchscreen. However, as shown in FIG. 6B, when the TX and RX channels are disabled in the palm rejection zone, the raw data shows that the active pen may pair with the touch controller when the user's palm is in contact with the touchscreen.

Figure 7A:
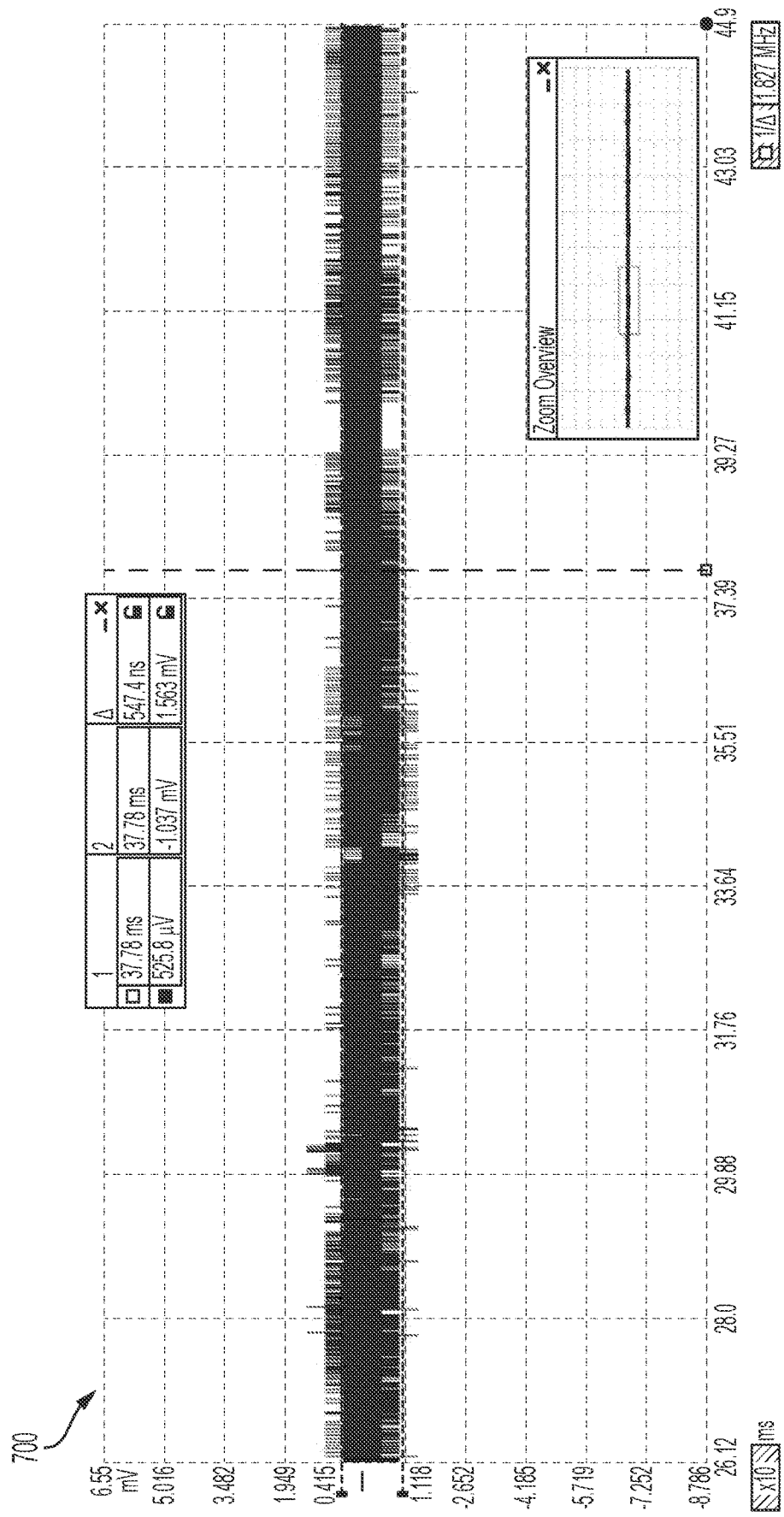
FIGS. 7A and 7B show resulting waveforms of uplink and downlink signals.
Figure 7B:
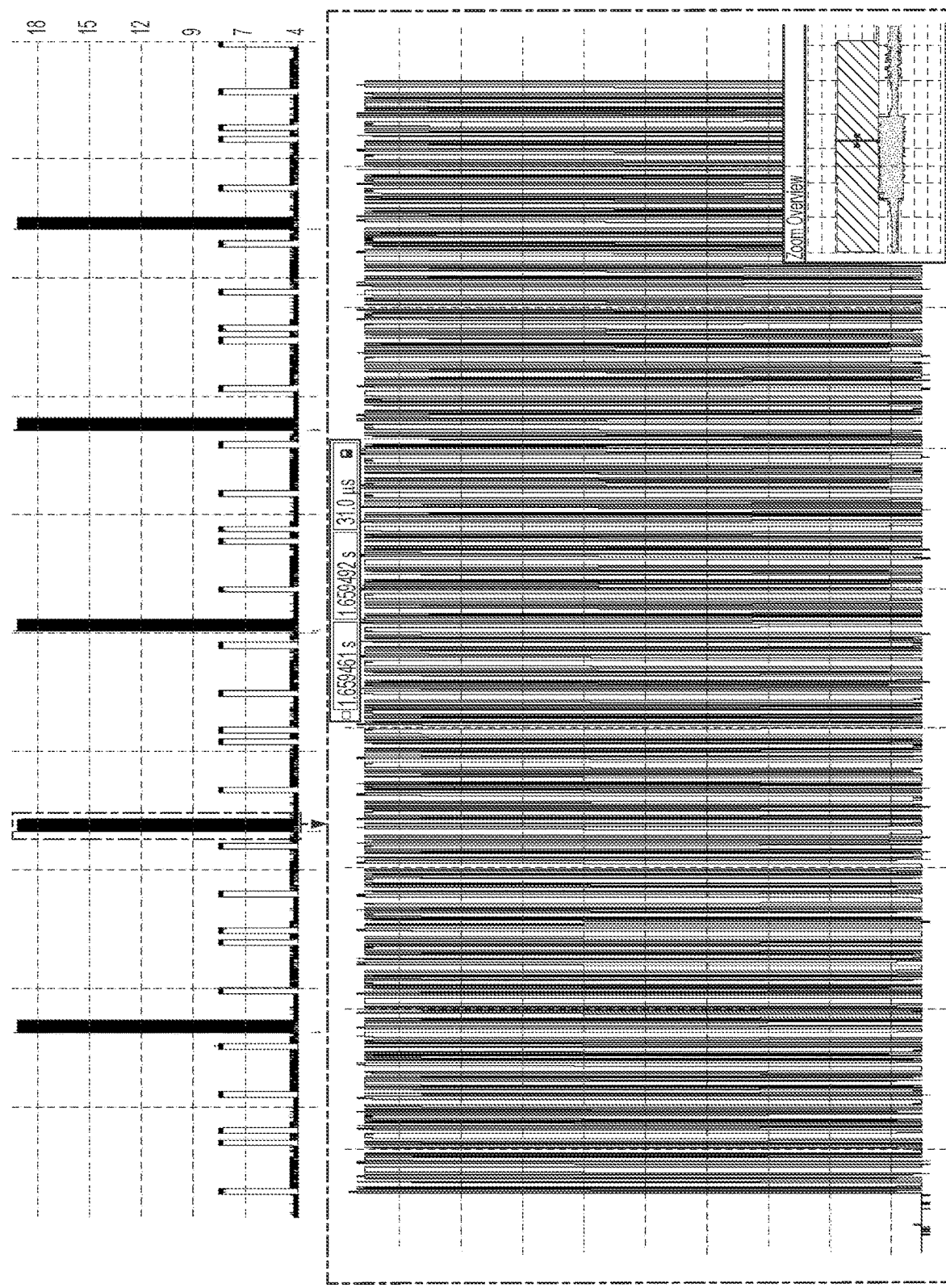

FIGS. 7A and 7B show resulting waveforms of uplink and downlink signals according to an embodiment of the present application.

In one or more embodiments, the signal transmitted from a touch controller of a touch screen panel to an active pen may be defined as an uplink signal and the signal transmitted by an active pen to a touch controller may be defined as a downlink signal. In embodiments, a normal uplink signal waveform is periodic with an amplitude of between 2V and 10V, e.g., 6V.

FIG. 7A shows a waveform of an uplink signal with all TX and RX channels enabled when a user's palm is in contact with the touch screen panel. The uplink signal may encounter a decode error and the active pen fails to send a downlink signal from the active pen to the touch controller. For example, the detected uplink signal may be non-periodic with a predetermined amplitude (e.g., 1.563 mv in but one specific example) and a downlink signal may not be detected.

FIG. 7B shows a waveform of an uplink signal and a downlink signal with the TX and RX channels disabled where a user's palm is in contact with the touch screen panel. When the TX and RX channels are disabled where a user's palm is in contact, the uplink signal may decode successfully. The resulting waveform, for example, detects a periodic uplink signal with an amplitude of 6V with intermittent downlink signals in each pen frame.

Figure 8:
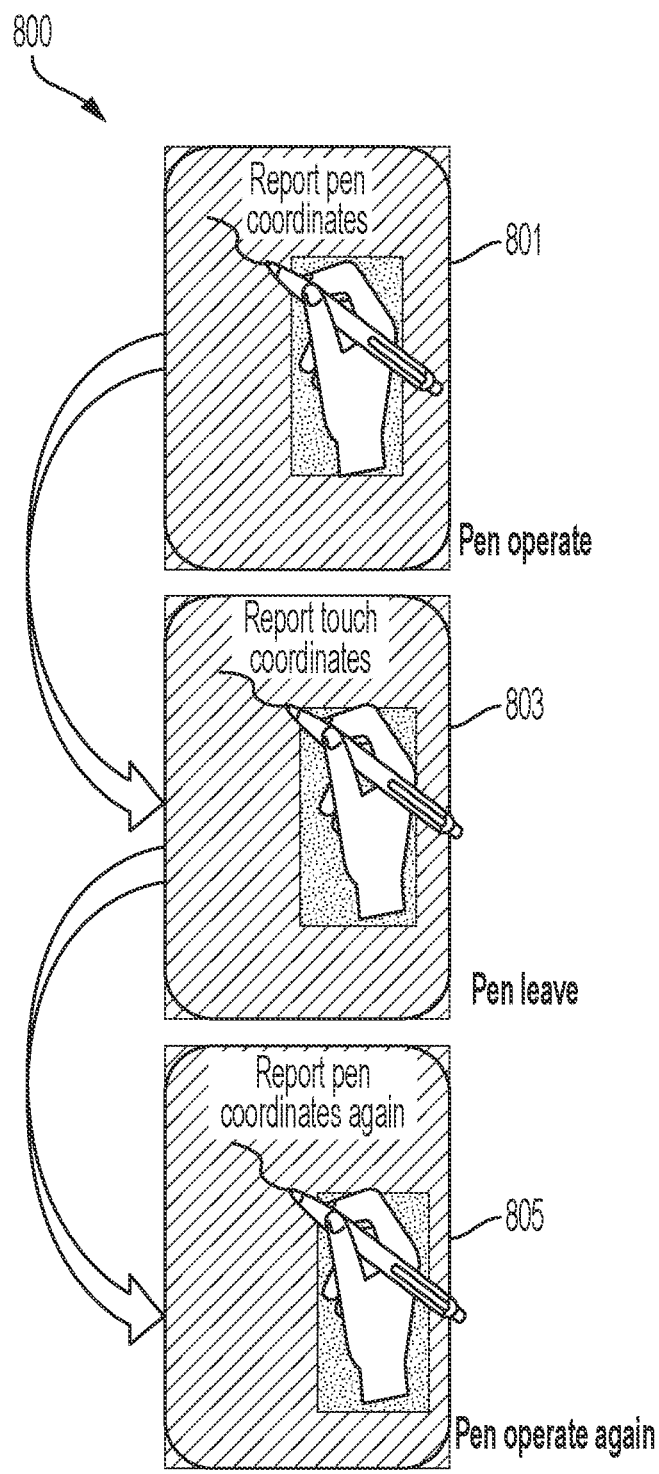
FIG. 8 shows a schematic representation of a method of operating an active pen on a touch screen panel according to an embodiment of the present application.
Figure 9:
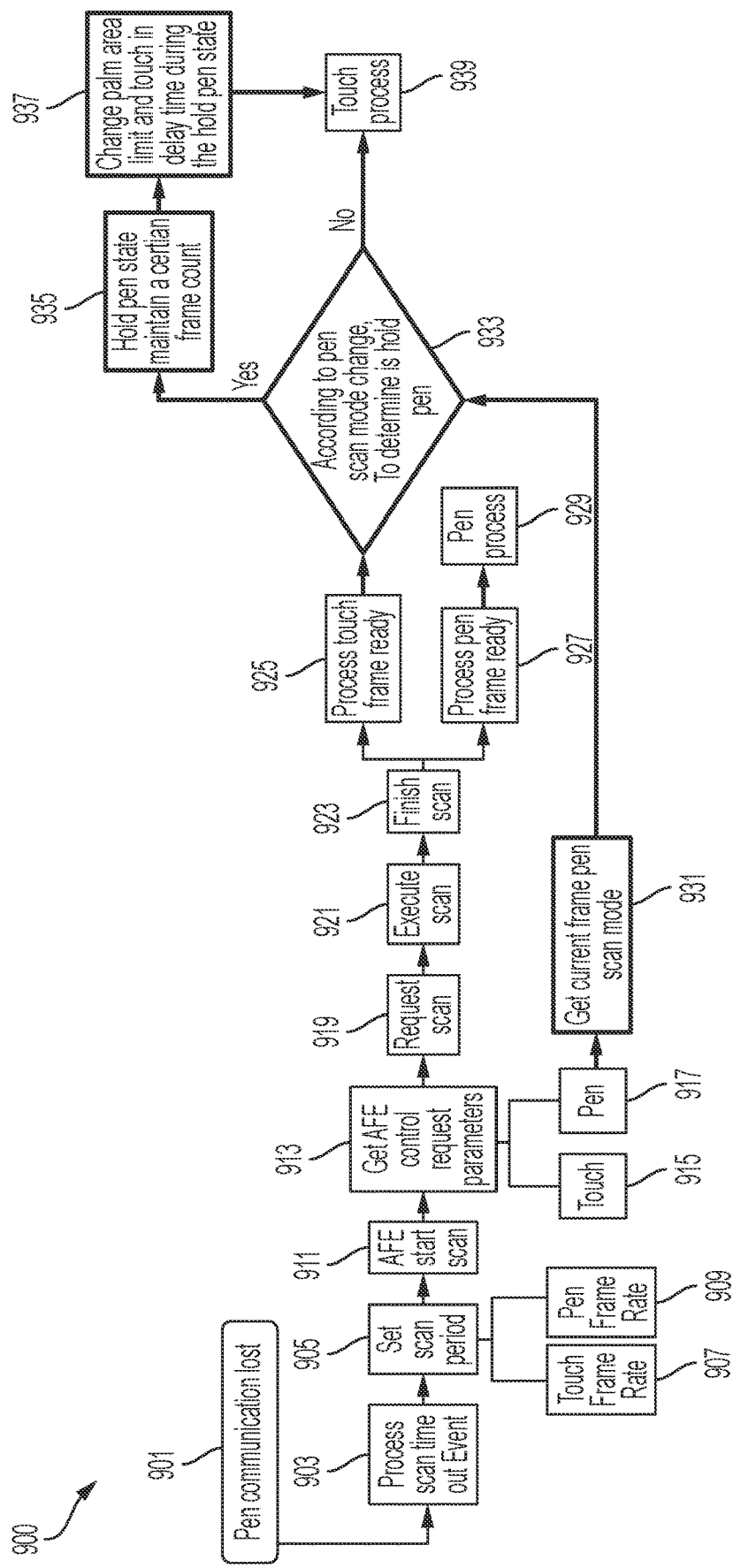
FIG. 9 shows a flowchart of a method of processing a connection on a touch screen panel according to an embodiment of the present application.

FIG. 8 shows a schematic representation of a method of operating an active pen on a touch screen panel according to an embodiment of the present application. FIG. 9 shows a flowchart of a method of processing a connection on a touch screen panel according to an embodiment of the present application. These figures provide a more detailed look as steps 411 to 420 of FIG. 4.

FIG. 8 shows the situation when the pen is operating (step 801), moves away from the touch screen (step 803) and then operates again (step 805). When the pen moves away from the touch screen in step 803, the system determines whether to keep the current touch zone or begin again because either the pen has moved to a different area of the screen or the user is wanting to operate in touch mode instead of active pen mode.

Referring to step 801, when the active pen is in operation mode and in contact with a touchscreen, the pen coordinates may be reported to a host to provide a continuous and smooth pen stroke. Referring to step 803, when the active pen is no longer in contact with the touchscreen, the active pen may return to discovery mode and the touch coordinates from a user's palm may be reported to the host. The reported touch coordinates may be disabled to prevent interference between the active pen and the touchscreen. In one or more embodiments, the touch coordinates may change as the user's palm moves across the touchscreen. Referring to step 805, when the active pen is paired and enters operation mode again, the pen coordinates will report normally to the host.

The method 900 of processing the connection on the touch screen panel may be implemented to prevent reporting of touch coordinates from a user's touch when the active pen is not in contact with the touchscreen.

In the situation in step 803, the active pen is no longer in contact with the touchscreen, e.g., the touch screen loses communication with the pen, the system can execute the operation of step 901. In this mode, a scan time out event may be processed 903. When the scan time out event has been processed, a scan period may be set 905. The scan period may include a touch frame rate 907 and a pen frame rate 909. When the scan period is set, the AFE scan starts 911. The AFE scan may collect the AFE control request parameters for touch 915 and pen 917. The AFE control request parameters for the pen 917 may include collecting a current frame pen scan mode 931.

In one or more embodiments, when the AFE control request parameters are collected, the touch screen panel may request scan 919, execute the scan 921, and finish the scan 923. When the scan is finished, the touch screen panel may be ready to process touch frame 925 and process pen frame 927. When the process pen frame is ready, the touch screen panel may receive pen process 929. When the process touch frame is ready, the touch screen panel may determine whether to hold the pen state 933 according to a change in the pen scan mode 931. When the pen scan mode is changed, the pen state may be held and maintained for a predetermined frame count 935. During the hold pen state, a palm area limit may be changed for a set delay time 937. When the set delay time has elapsed, the touch panel may receive touch process 939. In some embodiments, the delay might be one to ten seconds, in other embodiments from two to five seconds.

As discussed herein, embodiments of the invention can improve the uplink signal for pairing performance. Examples can provide a way to optimize or at least improve the process flow for resolving the coordinates disorder. For example, the uplink signal quality can be improved by obtaining the touched channels based on touch islands bitmap and disabling touched channels in uplink transmission to reduce the side effect of uplink. Coordinate disorder can also be resolved by maintaining the pen state and the palm state by connecting pen process with touch process and holding the pen state for a certain frame count and setting other parameters for blocking report touch coordinates when in the pen state.

Example embodiments of the present invention are summarized here. Other embodiments can also be understood from the entirety of the specification and the claims filed herein. It is understood that various embodiments described herein can be combined.

Example 1. A first example comprises a method of operating a touch screen panel. The method comprises initiating a communication between the panel and an active pen and determining a touch zone of the panel. The touch zone includes communication channels that are operating by touch while bi-directional communication is occurring between the panel and active pen. The method also includes disabling communications channels within the touch zone, performing communication between the panel and the active pen while the communications channels within the touch zone are disabled, determining that the communication between the panel and the active pen has stopped, continuing to disable the communications channels within the touch zone for a set time delay while no communication occurs between the panel and the active pen, and enabling the communication channels within the touch zone after the set time delay.

Example 2. The method of example 1 can further comprise providing pen location information to a host in response to performing the communication between the panel and the active pen while the communications channels.

Example 3. In the above examples, the touch zone can comprise calculating a plurality of palm channels using a touch islands bitmap.

Example 4. In the above examples, disabling communication channels can comprise disabling the calculated palm channels.

Example 5. The method of any of the above examples can further comprise determining a communication between the panel and the active pen has been reinitiated before the set time delay has expired and resuming communication between the panel and the active pen while continuing to disable the communications channels within the touch zone.

Example 6. The method of any of the above examples can further comprise receiving touch processing in the touch zone after enabling the communication channels within the touch zone.

Example 7. In the above examples, the set time delay can be one to ten seconds.

Example 8. In the above examples, the communication between the panel and the active pen comprises an uplink signal transmitted from the panel to the active pen and a downlink signal transmitted from the active pen to the panel.

Example 9. In other example, a touch screen device comprises a matrix panel that includes a plurality of touch sensors arranged in columns and rows. The touch screen device also includes a controller configured to detect an active pen, transmit a signal to the active pen, receive a signal generated by the active pen, determine a user's touch coordinates on the matrix panel, disable touch sensors associated with the user's touch coordinates, determine whether coordinates of the active pen on the matrix panel while the touch sensors associated with the user's touch coordinates are enabled or disabled, determine that the active pen is no longer detected when the coordinates are disabled, set a timer to run for a set delay time, again determine coordinates of the active pen on the matrix panel while the touch sensors associated with the user's touch coordinates remain disabled in response to detection of the active pen before the set delay time, and enable the touch sensors associated with the user's touch coordinates in response to the set delay time expiring without detection of the active pen.

Example 10. The device of example 9 can further comprise a host coupled to the controller, the host comprising processing hardware configured to execute software that utilizes user input obtained from the determined coordinates of the active pen.

Example 11. In examples 9 and 10, the touch sensors can comprise capacitive electrodes.

Example 12. In examples 9 to 11, the signal transmitted to the active pen can be an uplink signal and the signal transmitted from the active pen to the panel can be a downlink signal.

Example 13. In examples 9 to 12, the controller can be configured to disable the plurality of touch sensors based on the user's touch coordinates.

Example 14. In examples 9 to 13, the set time delay can one to ten seconds.

Example 15. In examples 9 to 14 the controller can determine the user's touch coordinates using a touch islands bitmap.

Example 16. Another general aspect provides a method of operating a touch screen panel with an active pen. The method comprises pairing the active pen and the touch screen panel, enabling all channels of the touch screen panel, detecting a touch while the active pen and the touch screen panel are paired, determining a touch zone in response to determining the touch, disabling the channels in the touch zone, determining active pen locations based on communication between the active pen and the touch screen panel, determining that active pen is no longer communicating with the touch screen panel, setting a timer in response to determining that active pen is no longer communicating with the touch screen panel, attempting to detect the pen for at least a set delay time after setting the timer, determining active pen locations based on communication between the active pen and the touch screen panel while the channels in the touch zone remain disabled in response to the active pen being detected before expiration of the set delay time, and enabling the channels in the touch zone in response to expiration of the set delay time without detection of the active pen.

Example 17. The method of example 16 can further comprise, after enabling the channels in the touch zone, determining touch locations based on capacitive sensing at the touch screen panel.

Example 18. In examples 16 and 17, the set time delay can be one to ten seconds.

Example 19. The method of any of examples 16 to 18 can further comprise providing the active pen locations a host and executing a software application that utilized the active pen locations.

Example 20. The method of any of examples 16 to 19 can further comprise determining an updated touch zone, enabling channels in the touch zone that are not in the updated touch zone and disabling channels in the updated touch zone that are not in the touch zone.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A method of operating a touch screen panel, the method comprising:
   initiating a communication between the panel and an active pen;
   determining a touch zone of the panel, the touch zone including communication channels that are operating by touch while bi-directional communication is occurring between the panel and active pen;
   disabling communications channels within the touch zone;
   performing communication between the panel and the active pen while the communications channels within the touch zone are disabled;
   determining that the communication between the panel and the active pen has stopped;
   setting a timer to run for a set time delay;

continuing to disable the communications channels within the touch zone during the set time delay while no communication occurs between the panel and the active pen; and enabling the communication channels within the touch zone when the set time delay expires.

2. The method of claim 1, further comprising providing pen location information to a host in response to performing the communication between the panel and the active pen while the communications channels.

3. The method of claim 1, wherein determining the touch zone comprises calculating a plurality of palm channels using a touch islands bitmap.

4. The method of claim 3, wherein disabling communication channels comprises disabling the calculated palm channels.

5. The method of claim 1, further comprising:
determining a communication between the panel and the active pen has been reinitiated before the set time delay has expired; and
resuming communication between the panel and the active pen while continuing to disable the communications channels within the touch zone.

6. The method of claim 1, further comprising, after enabling the communication channels within the touch zone, receiving touch processing in the touch zone.

7. The method of claim 1, wherein the set time delay is one to ten seconds.

8. The method of claim 1, wherein the communication between the panel and the active pen comprises:
an uplink signal transmitted from the panel to the active pen; and
a downlink signal transmitted from the active pen to the panel.

9. A touch screen device comprising:
a matrix panel comprising a plurality of touch sensors arranged in columns and rows;
a controller configured to:
detect an active pen;
transmit a signal to the active pen;
receive a signal generated by the active pen;
determine a user's touch coordinates on the matrix panel;
disable touch sensors associated with the user's touch coordinates;
determine whether coordinates of the active pen on the matrix panel while the touch sensors associated with the user's touch coordinates are enabled or disabled;
determine that the active pen is no longer detected when the coordinates are disabled;
set a timer to run for a set delay time;
in response to detection of the active pen before the set delay time, again determine coordinates of the active pen on the matrix panel while the touch sensors associated with the user's touch coordinates remain disabled; and
in response to the set delay time expiring without detection of the active pen, enable the touch sensors associated with the user's touch coordinates.

10. The touch screen device of claim 9, further comprising a host coupled to the controller, the host comprising processing hardware configured to execute software that utilizes user input obtained from the determined coordinates of the active pen.

11. The touch screen device of claim 9, wherein the touch sensors comprise capacitive electrodes.

12. The touch screen device of claim 9, wherein the signal transmitted to the active pen is an uplink signal and the signal transmitted from the active pen to the touch screen device is a downlink signal.

13. The touch screen device of claim 9, wherein the controller is configured to disable the plurality of touch sensors based on the user's touch coordinates.

14. The touch screen device of claim 9, wherein the set time delay is one to ten seconds.

15. The touch screen device of claim 9, wherein the controller determines the user's touch coordinates using a touch islands bitmap.

16. A method of operating a touch screen panel with an active pen, the method comprising:
pairing the active pen and the touch screen panel;
enabling all channels of the touch screen panel;
detecting a touch while the active pen and the touch screen panel are paired;
determining a touch zone in response to determining the touch, the touch zone including channels when the touch has been detected;
disabling the channels in the touch zone;
determining active pen locations based on communication between the active pen and the touch screen panel;
determining that active pen is no longer communicating with the touch screen panel;
setting a timer in response to determining that active pen is no longer communicating with the touch screen panel;
after setting the timer, attempting to detect the active pen for at least a set delay time;
in response to the active pen being detected before expiration of the set delay time, determining active pen locations based on communication between the active pen and the touch screen panel while the channels in the touch zone remain disabled; and
in response to expiration of the set delay time without detection of the active pen, enabling the channels in the touch zone.

17. The method of claim 16, further comprising, after enabling the channels in the touch zone, determining touch locations based on capacitive sensing at the touch screen panel.

18. The method of claim 16, wherein the set time delay is one to ten seconds.

19. The method of claim 16, further comprising:
providing the active pen locations a host; and
executing a software application that utilized the active pen locations.

20. The method of claim 16, further comprising:
determining an updated touch zone;
enabling channels in the touch zone that are not in the updated touch zone; and
disabling channels in the updated touch zone that are not in the touch zone.

* * * * *